(12) United States Patent
Waters (10) Patent No.: US 7,077,489 B2
(45) Date of Patent: Jul. 18, 2006

(54) APPARATUS FOR PRINTING AND MEMORY TAG APPLICATION AND METHOD THEREFOR

(75) Inventor: John Deryk Waters, Bath (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 223 days.

(21) Appl. No.: 10/697,031

(22) Filed: Oct. 31, 2003

(65) Prior Publication Data

US 2004/0141790 A1 Jul. 22, 2004

(30) Foreign Application Priority Data

Nov. 21, 2002 (GB) ............................... 0227199.7

(51) Int. Cl.
*B41J 3/00* (2006.01)
(52) U.S. Cl. ..................... 347/2; 340/572.1; 156/64; 156/384
(58) Field of Classification Search ............... 347/2
See application file for complete search history.

(56) References Cited

U.S. PATENT DOCUMENTS

| 5,497,140 | A | 3/1996 | Tuttle | |
| 6,163,260 | A | 12/2000 | Conwell et al. | |
| 6,280,544 | B1 * | 8/2001 | Fox et al. | 156/64 |
| 6,645,327 | B1 * | 11/2003 | Austin et al. | 156/64 |
| 6,857,714 | B1 * | 2/2005 | Hohberger et al. | 347/2 |

FOREIGN PATENT DOCUMENTS

| JP | 11-091273 A | 4/1999 |
| JP | 11-096318 A | 4/1999 |
| JP | 2002123805 A | 4/2002 |

* cited by examiner

*Primary Examiner*—Thinh Nguyen
*Assistant Examiner*—Brian J. Goldberg
(74) *Attorney, Agent, or Firm*—Foley & Lardner LLP (57) ABSTRACT

Apparatus for printing and memory tag application onto a base medium includes a print head for printing onto the base medium, and a memory tag dispenser movable relative to the base medium for applying memory tags to the base medium. The print head may also be moveable relative to the base medium.

14 Claims, 6 Drawing Sheets

APPARATUS FOR PRINTING AND MEMORY TAG APPLICATION AND METHOD THEREFOR

FIELD OF THE INVENTION

The invention relates to printing apparatus, and in particular to such apparatus which in addition to printing can apply memory tags to the paper or other base medium being printed onto, and to a method of doing so.

BACKGROUND OF THE INVENTION

Memory tags in the form of Radio Frequency Identification (RFID) tags are well known in the prior art, and the technology is well established (see for example: RFID Handbook, Klaus Finkenzeller, 1999, John Wiley & Sons). RFID tags come in many forms but all comprise an integrated circuit with information stored on it and a coil which enables it to be interrogated by a reader which also powers it by means of an inductive (wireless) link. Until recently RFID tags have been quite large, due to the frequency they operate at (13.56 MHz) and the size of coil they thus require, and have had very small storage capacities. Such RFID tags have tended to be used in quite simple applications, such as for file tracking within offices or in place of or in addition to bar codes for product identification and supply chain management.

Much smaller RFID tags have also been developed, operating at various frequencies. For example Hitachi-Maxell have developed "coil-on-chip" technology in which the coil required for the inductive link is on the chip rather than attached to it. This results in a memory tag in the form of a chip of 2.5 mm square, which operates at 13.56 MHz. In addition Hitachi has developed a memory tag they call a "mu-chip" which is a chip of 0.4 mm square and operates at 2.45 GHz.

These smaller memory tags can be used in a variety of different applications. Some are even available for the tagging of pets by implantation.

There are however many further uses to which such memory tags may be put. For example in EP 1 076 316 A2 an application is described whereby a memory tag is attached to a print of a photograph and contains data about the print concerned.

SUMMARY OF THE INVENTION

According to a first aspect of the present invention there is provided apparatus for printing and memory tag application onto a base medium, the apparatus having a print head for printing onto the base medium, and a memory tag dispenser movable relative to the base medium for applying memory tags to the base medium at a desired location.

The invention provides the ability to apply one or more memory tags to a base medium at selected locations, and to co-ordinate this with printing also applied to the base medium. This means that documents can be produced with memory tags in various locations with stored on them data to supplement the printed information.

The print head may also be moveable relative to the base medium.

Preferably the base medium is moved along a first axis through or past the apparatus and the print head if moveable moves back and forth along a second axis and the memory tag dispenser moves back and forth along a third axis, the second and third axes being substantially perpendicular to the first axis.

The print head and memory tag dispenser may be connected together and move in unison along the second and third axes.

Preferably the memory tag dispenser includes a supply of memory tags on a flexible substrate and a substrate guide path which takes the substrate past a memory tag application station where memory tags are removed from the substrate and applied to the base medium as required.

The memory tag application station may include a reciprocating member adapted to apply pressure to the substrate opposite the location of a memory tag pushing the memory tag onto the base medium, thus transferring the memory tag from the substrate to the base medium.

The memory tag dispenser further may further include a data writing station where data is written to the memory tags and which is located such that the substrate passes it shortly before passing the memory tag application station.

The data writing station may also read the memory tags after writing to them to check that the data has written correctly. Alternatively the memory tag dispenser further includes a data check station which the memory tags pass after the data write station and where the memory tags are read and the data checked with that written at the data write station.

Preferably the base medium passes the print head before passing the memory tag dispenser.

The apparatus may be adapted to handle base medium in sheet form which passes through the apparatus, and in particular to handle sheets of paper or like material.

Preferably the base medium passes through the apparatus with a surface towards the print head and the memory tag dispenser, and the printing and the memory tag are applied to that surface.

According to a second aspect of the invention there is provided a method of printing onto a base medium and applying a memory tag to the base medium comprising the steps of:

i) feeding the base medium along a first axis past a print head;

ii) printing onto the base medium;

iii) feeding the base medium past a memory tag dispenser, and iv) moving the memory tag dispenser along a third axis substantially perpendicular to the first axis and applying a memory tag to the base medium at a desired location.

The method may further comprise the step of moving the print head relative to the base medium. Such movement may be along a second axis substantially perpendicular to the first axis.

The movement of the memory tag dispenser may be along a third axis substantially perpendicular to the first axis.

Preferably the method further comprises the step of writing data to the memory tag, prior to applying it to the base medium.

Conveniently the method also comprises the step of reading the data on the memory tag and checking it against the data written to it.

The memory tag may be applied to the base medium at a location printed with a preselected icon.

The method may be used such that a plurality of memory tags are applied to the base medium.

BRIEF DESCRIPTION OF THE DRAWINGS

Embodiments of apparatus according to the invention will now be described, by way of example only, with reference to the accompanying drawings, in which.

DETAILED DESCRIPTION OF THE PREFERRED EMBODIMENTS

Figure 1:
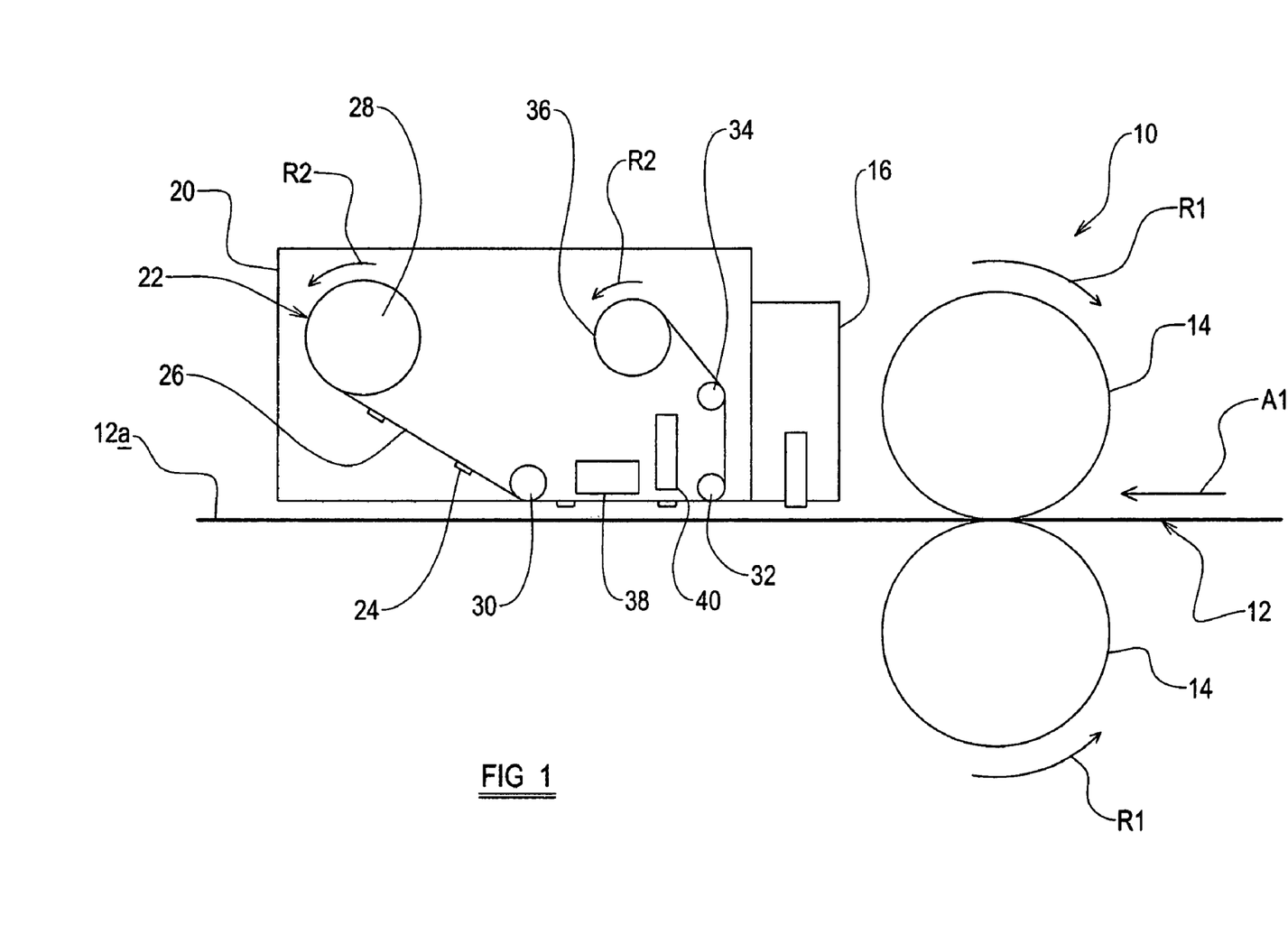
FIG. 1 is a schematic of the main elements of a first embodiment of apparatus according to the invention from the side.
Figure 2:
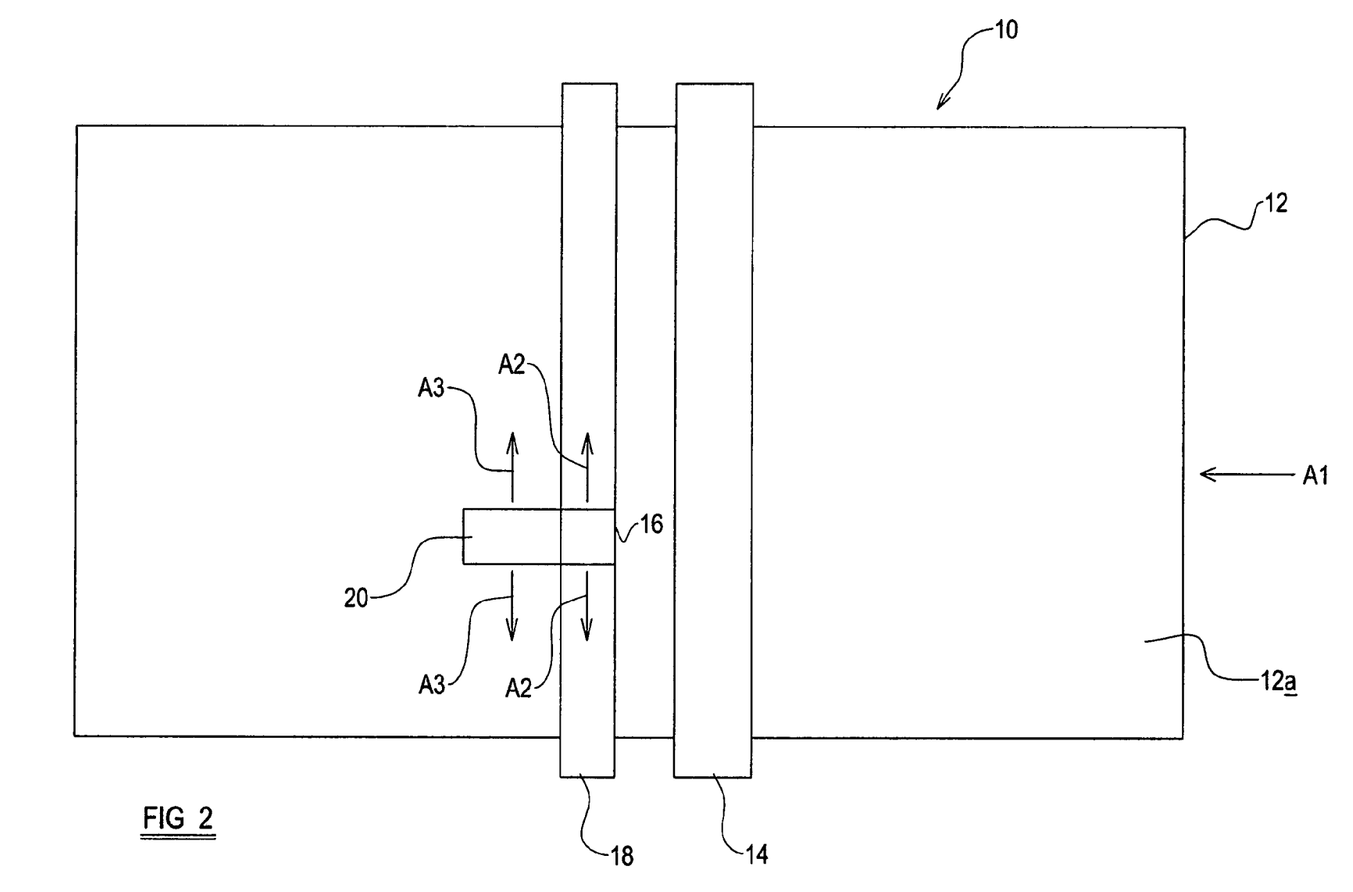
FIG. 2 is a schematic of the apparatus of FIG. 1 from above.

Referring to FIGS. 1 and 2 apparatus 10 for printing and memory tag placement onto a base medium, in this case sheet paper 12, is illustrated. For simplicity only those parts of the apparatus 10 which need to be shown to describe the invention are illustrated.

The apparatus 10 includes much known technology from the prior art of printers which is not described here. However, the apparatus 10 includes paper feed rollers 14 which are driven to rotate as indicated by arrows R1 to feed the paper sheets 12 through the apparatus 10 along a first axis in the direction indicated by arrows A1.

The apparatus 10 further includes a print head 16, which in this example is of ink jet form, mounted on a print head carriage 18 which extends across the apparatus 10 substantially perpendicular to the axis A1. The print head 16 is moveable back and forth along the print head carriage 18, in known manner. Thus the print head 16 is moveable back and forth along a second axis indicated by arrows A2, substantially perpendicular to the axis A1, to enable the print head 16 to access most of the upper surface 12a of the paper sheet 12 as it moves through the apparatus 10, and thus to print anywhere on that accessible area of surface 12a as required.

The apparatus 10 also includes a memory tag dispenser 20 which in this embodiment is connected to the print head 16 for movement back and forth along the print head carriage 18 with the print head 16. Thus the memory tag dispenser 20 is moveable back and forth along a third axis indicated by arrows A3, substantially perpendicular to the axis A1, and parallel to the axis A2, to enable the memory tag dispenser 20 to apply memory tags to anywhere on the accessible area of surface 12a, as will be described further below.

The memory tag dispenser 20 includes a supply 22 of memory tags 24 removably secured to a substrate 26 by appropriate adhesive, the memory tags 24 having further adhesive on the faces opposite the substrate 26. A substrate guide path comprising rollers 28, 30, 32, 34 and 36 guides the substrate 26 and thus the memory tags 24 through the dispenser 20. Roller 36 is driven to rotate in the direction of arrow R2 to pull the substrate 26 along the guide path from the supply 22 on roller 28. The memory tag dispenser 20 further includes a data write station 38 and a memory tag application station 40 located adjacent to the substrate guide path such that the substrate 26 passes between the data write station 38 and the memory tag application station 40 and the paper sheet 12.

The data writing station 38 is used to write data to the memory tags 24, in known manner, whilst they are still on the substrate 26, shortly before they are applied to the paper sheet 12. Then, at the memory tag application station 40 a reciprocating member (not shown) can on command push the substrate 26, behind the location of a memory tag 24 to be applied to the paper sheet 12, downwards and thus apply the memory tag 24, by means of the adhesive on it's face opposite the substrate 26, to the paper sheet 12. The empty substrate 26, following the removal of the memory tags 24, is wound onto roller 36 for later disposal when a fresh supply 22 is loaded into the memory tag dispenser 20 if appropriate, or replacement of the whole memory tag dispenser 20 if it is a disposable unit as for the toner cartridges in most printers.

Figure 3:
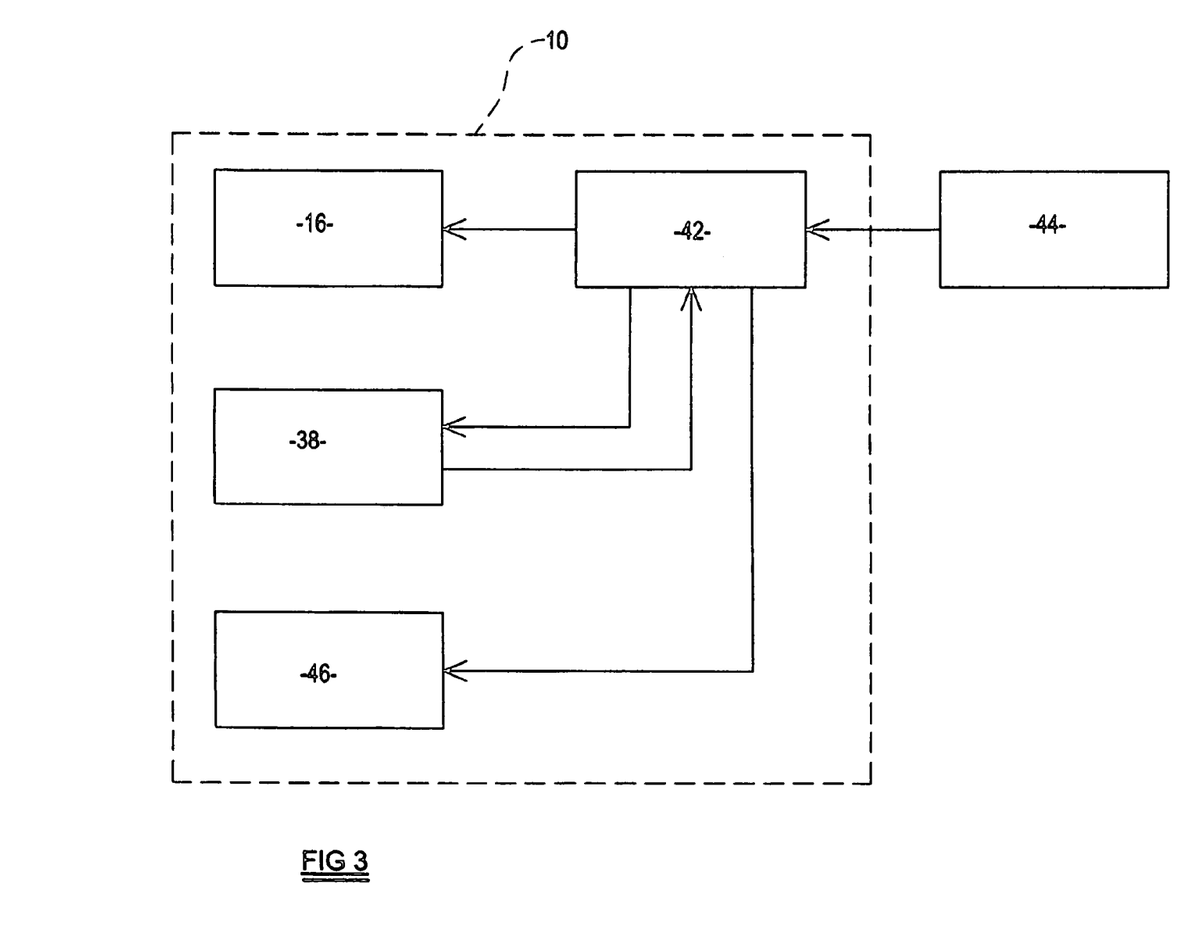
FIG. 3 is a block diagram of the control of the apparatus according to the invention.

The method of operation of the apparatus 10 will now be described, with reference also to FIG. 3. The apparatus 10 includes a main processor 42 which receives instruction signals from a host computer 44, including the details of what to print, where to print it, what data to write to the memory tag or tags 24 to be applied to the paper sheet 12, and where on the paper sheet 12 the memory tag or tags 24 are to be applied. The main processor 42 sends command signals as required to the mechanics controller 46, which controls all the mechanical operations of the apparatus, (i.e. the paper feed rollers 14, the movement of the print head 16 and memory tag dispenser 20 along the print head carriage 18 and the operation of memory tag dispenser 20), to the print head 16 and to the data write station 38. Thus the paper sheet 12 is fed through the apparatus 10 and has the required information printed on it's upper surface 12a. At the same time the required memory tags 24 have the necessary data written to them at the data write station 38 prior to being moved to the tag application station 40 where they are applied to the upper surface 12a of the paper sheet 12 in the required location(s).

The manner of co-ordination of the printing, data writing and tag application processes will depend on a number of factors. If, for example, the memory tags 24 are only to be applied adjacent the top and/or bottom of the paper sheet 12 then the data writing and tag application processes can take place before and/or after the printing. This would avoid the necessity for the printing process to be interrupted, and would make the co-ordination simpler. Further, when implemented with an inkjet printer, which in general requires a pause, after printing has been completed before the paper sheet is ejected, to allow the ink to dry, the data writing and tag application processes could conveniently take place during this pause for memory tags applied adjacent the bottom of the paper sheet.

It is likely that the memory tags 24 will be read in future both by further apparatus which can scan the paper sheet 12 to locate the memory tags 24 and by hand held readers. Thus in order to assist users in the future to locate the memory tags 24 on the paper sheet 12 the memory tags 24 may be applied to the paper sheet 12 on top of printed icons which can be readily identified by users.

Figure 6:
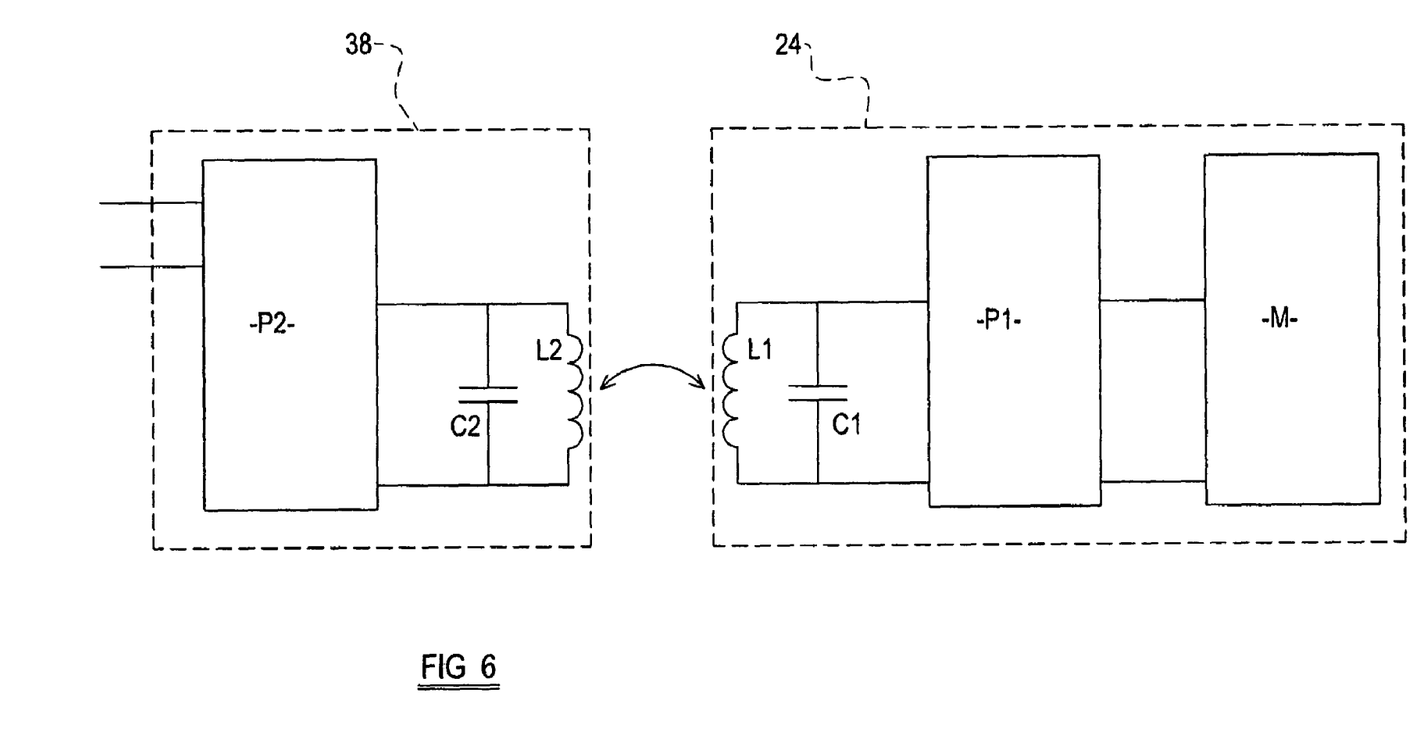
FIG. 6 is a schematic of a memory tag and data write device as incorporated in any embodiment of the invention.

Referring now to FIG. 6 the basic operation of the memory tags 24 and of the data write station 38 will be described. The memory tag 24 includes an antenna coil L1 and a capacitor C1 connected in parallel therewith to form a resonant circuit. It further includes a memory M and processing and power circuit P1. The data write station 38 includes an antenna coil L2 and a capacitor C2 in parallel therewith to form a resonant circuit, and a processing and signal generating circuit P2.

A signal generator within P2 generates a signal at the chosen frequency, such as 2.45 GHz, this is applied to the antenna coil L2 and thus generates an electro-magnetic field which, provided the memory tag 24 is sufficiently close to the data write device 38, penetrates the antenna coil L1 of the memory tag 24. By induction a voltage is thus generated in the antenna coil L1, this is rectified in circuit P1 and used to power the memory tag 24. The capacitance of the capacitors C1 and C2 is selected such that the resonant circuits are both resonant at the frequency generated by the signal generator, in order to maximize transmitted signal strength and received signal.

When data is to be written to the memory tag 24 by the data write device 38 the radio frequency signal generated in P2 is modulated, e.g. amplitude modulated, with the data before being applied to the antenna coil L2 and transmitted. The signal received by the memory tag 24 by inductive coupling thus both powers the memory tag 24 and communicates with it, the circuit P1 separating the data signal from the carrier and passing data for storage to the memory M.

Similarly, if data is to be read from the memory tag 24 the circuit P1 applies a signal indicative of the data to the antenna coil L1 which is detected, as a result of the inductive coupling, by antenna coil L2 and deciphered in circuit P2 before being passed from the data write device 38 to main processor 42 of the apparatus 10. This signal may for example be transmitted using load modulation. In RFID systems such as this the power consumed by the memory tag 24 can be measured as a drop in voltage across the internal resistance of the antenna coil L2 of the data write device 38. A load resistance within the circuit P1 may be switched on and off, thus altering the power consumed by the memory tag 24 which is then detected as an amplitude modulation of the voltage across the antenna coil L2 of the data write device 38.

The apparatus 10 has been described as appropriate for use with paper sheets 12. However, embodiments of the invention may also be constructed for use with other base media, for example paper in fan fold or roll form, other sheet material, or indeed boxes or other packages passing underneath, rather than through the apparatus 10, on some kind of conveyor.

Figure 4:
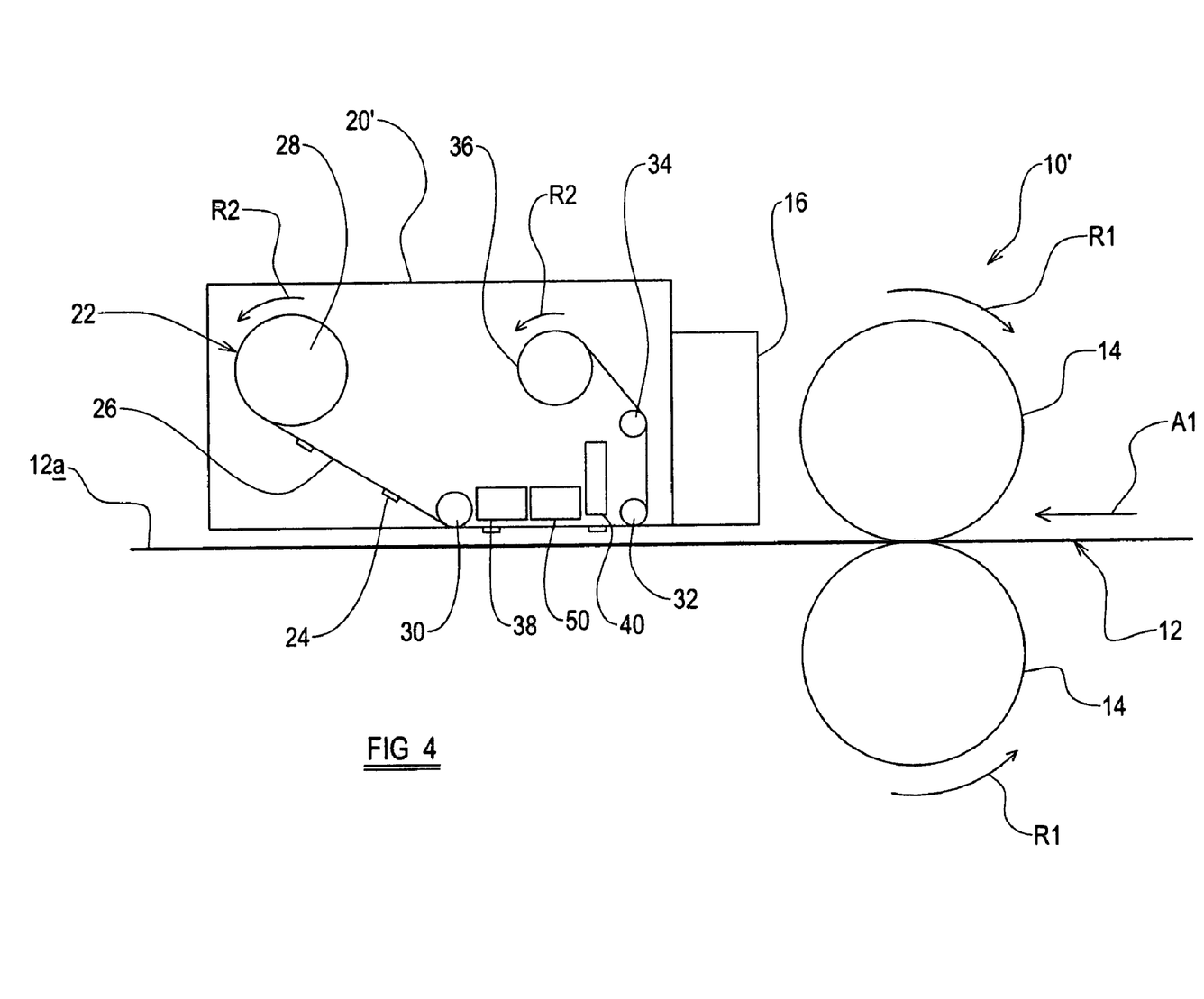
FIG. 4 is a schematic of the main elements of a second embodiment of apparatus according to the invention from the side.

The data write station 38 may, in addition to writing the data to the memory tags 24, also conduct a read operation to check that the data has written successfully before the memory tag 24 is applied to the base medium. Alternatively, particularly if the apparatus 10' is operating at high speed, a separate data check station 50 may be included in apparatus 10', this would be conveniently located between the data write station 38 and the memory tag application station 40, within the memory tag dispenser 20' as shown in FIG. 4 (where parts common to the apparatus 10 of FIG. 1 are like referenced).

Figure 5:
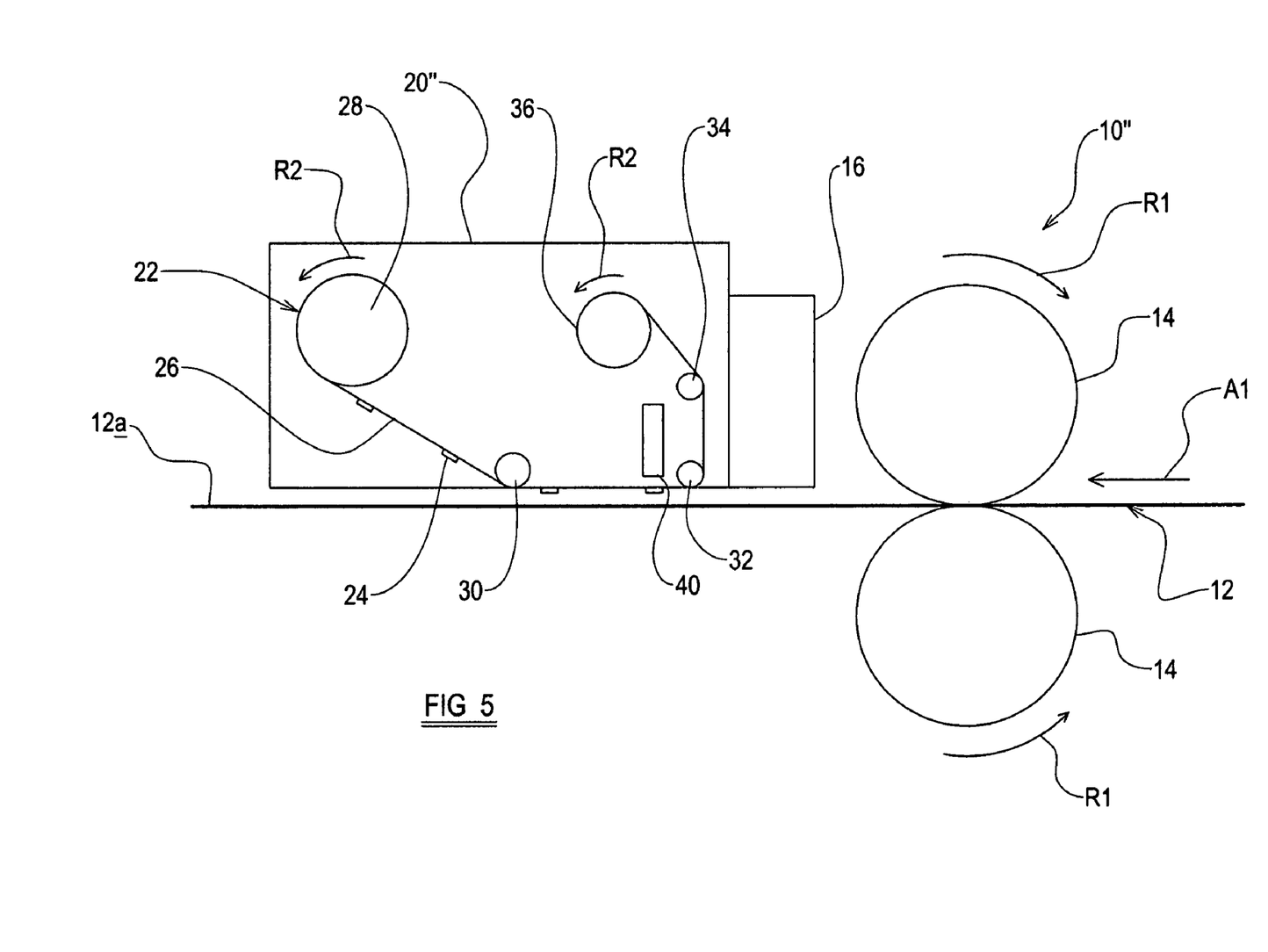
FIG. 5 is a schematic of the main elements of a third embodiment of apparatus according to the invention from the side.

A further alternative, for some very limited applications, is for the supply 22 of memory tags 24 to be pre-written with data when loaded into the apparatus 10. Clearly in such embodiments there would be no requirement for the inclusion of the data write station 38 within the memory tag dispenser 20" of the apparatus, and such a simplified apparatus 10" is shown in FIG. 5 (where parts common to the apparatus 10 of FIG. 1 are like referenced).

Although the print head 16 is described as being of ink jet form, the invention can be implemented with many different forms of print head and indeed many different forms of printer. For some forms of printer with moveable print heads it may be appropriate for the tag dispenser to be moveable independently of the print head, rather than these units being connected together for movement as one. The invention may also be implemented in printers in which the print head is not movable, such as laser printers. All such embodiments still fall within the scope of this invention.

The apparatus of the invention provides a significant advantage over the prior art in that more than one memory tag can be applied to a single base medium, and they can be applied to a large area of the base medium, i.e. that which is accessible to the memory tag dispenser. With the movement of the base medium through the apparatus and the movement of the tag dispenser within the apparatus the accessible area of the base medium is generally most of the area of the base medium, with just the boundaries not being accessible as for most printers.

The invention claimed is:

1. Apparatus for printing and memory tag application onto a base medium, the apparatus having a print head for printing onto the base medium, and a memory tag dispenser movable relative to the base medium for applying memory tags to the base medium, wherein the memory tag dispenser is movable within the apparatus in a direction which is essentially perpendicular to a direction in which the base medium moves in the apparatus in order to enable application of memory tags to the base medium at desired locations.

2. Apparatus according to claim 1 wherein the print head is movable relative to the base medium.

3. Apparatus according to claim 2 wherein the base medium is moved along a first axis through or past the apparatus and the print head moves back and forth along a second axis and the memory tag dispenser moves back and forth along a third axis, the second and third axes being substantially perpendicular to the first axis.

4. Apparatus according to claim 3 wherein the print head and memory tag dispenser are connected together and move in unison along the second and third axes.

5. Apparatus according to claim 3 wherein the base medium passes the print head before passing the memory tag dispenser.

6. Apparatus according to claim 1 wherein the memory tag dispenser includes a supply of memory tags on a flexible substrate and a substrate guide path which takes the substrate past a memory tag application station where memory tags are removed from the substrate and applied to the base medium as required.

7. Apparatus according to claim 6 wherein the memory tag application station includes a reciprocating member adapted to apply pressure to the substrate opposite the location of a memory tag pushing the memory tag onto the base medium, thus transferring the memory tag from the substrate to the base medium.

8. Apparatus according to claim 6 wherein the memory tag dispenser further includes a data write station where data is written to the memory tags and which is located such that the substrate passes it shortly before passing the memory tag application station.

9. Apparatus according to claim 8 wherein the data write station also reads the memory tags after writing to them to check that the data has written correctly.

10. Apparatus according to claim 8 wherein the memory tag dispenser further includes a data check station which the memory tags pass after the data write station and where the memory tags are read and the data checked with that written at the data write station.

11. Apparatus according to claim 1 wherein it is adapted to handle base medium in sheet form which passes through the apparatus.

12. Apparatus according to claim 11 wherein the base medium passes through the apparatus with a surface towards the print head and the memory tag dispenser, and the printing and the memory tag are applied to that surface.

13. Apparatus for printing and RFID tag application onto a base medium in sheet form, the apparatus having a print head for printing onto the base medium, and an RFID tag dispenser movable relative to the base medium for applying RFID tags to the base medium, wherein the base medium is moved along a first axis through or past the apparatus, the print head moves back and forth along a second axis, and the RFID tag dispenser moves back and forth along a third axis, the second and third axes being substantially perpendicular to the first axis and parallel to each other.

14. A method of printing onto a base medium in sheet form and applying an RFID tag to the base medium comprising:
- i) feeding the base medium along a first axis past a print head;
- ii) moving the print head along a second axis substantially perpendicular to the first axis;
- iii) printing onto the base medium;
- iv) feeding the base medium past an RFID tag dispenser;
- v) moving the RFID tag dispenser along a third axis substantially perpendicular to the first axis and substantially parallel to the second axis; and
- vi) applying an RFID tag to the base medium at a desired location.

* * * * *